US008994962B2

(12) United States Patent
Honma (10) Patent No.: US 8,994,962 B2
(45) Date of Patent: Mar. 31, 2015

(54) IMAGE FORMING SYSTEM AND CONTROL METHOD FOR THE SAME (71) Applicant: Mikimasa Honma, Tokyo (JP)

(72) Inventor: Mikimasa Honma, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 115 days.

(21) Appl. No.: 13/676,479

(22) Filed: Nov. 14, 2012

(65) Prior Publication Data
US 2013/0120764 A1 May 16, 2013

(30) Foreign Application Priority Data

Nov. 16, 2011 (JP) ................................. 2011-250727

(51) Int. Cl.
G06K 15/02 (2006.01)
(52) U.S. Cl.
CPC ........ G06K 15/02 (2013.01); G06K 2215/0082 (2013.01); G06K 15/1856 (2013.01); G06K 15/181 (2013.01)
USPC ........................... 358/1.1; 358/1.14; 358/1.15
(58) Field of Classification Search
USPC ........... 358/1.1, 1.15, 1.9, 1.14, 2.1, 1.6, 1.16
See application file for complete search history.

(56) References Cited

U.S. PATENT DOCUMENTS

| 5,642,208 | A | * | 6/1997 | Takahashi et al. | ............ | 358/501 |
| 2002/0054347 | A1 | * | 5/2002 | Ikeda | ............................ | 358/1.15 |
| 2004/0207871 | A1 | * | 10/2004 | Ando | ............................ | 358/1.15 |
| 2010/0265525 | A1 | * | 10/2010 | Hagiwara | | |
| 2012/0099152 | A1 | * | 4/2012 | Kamata | ........................ | 358/1.15 |

FOREIGN PATENT DOCUMENTS

| JP | 2005-225124 A | 8/2005 |
| JP | 2009-058623 A | 3/2009 |
| JP | 2009-066937 A | 4/2009 |

OTHER PUBLICATIONS

Japanese Office Action dated Dec. 10, 2013 (and English translation thereof) in counterpart Japanese Application No. 2011-250727.

* cited by examiner

Primary Examiner — Allen H Nguyen
(74) Attorney, Agent, or Firm — Holtz, Holtz, Goodman & Chick PC (57) ABSTRACT An image forming system includes a first image forming apparatus and a second image forming apparatus coupled in tandem to the first image forming apparatus which are assigned differently to print images on respective different regions on a recording sheet. The first image forming apparatus includes two compressing and expanding sections and is configured to receive both image data to be printed by the first image forming apparatus and image data to be printed by the second image forming apparatus. When performing any one process of a compressing process and an expanding process for the image data to be printed by the first image forming apparatus and a compressing process for the image data to be printed by the second image forming apparatus, a compressing and expanding section being used for no process is selected from the two compressing and expanding sections, and assigned to perform the any one process.

6 Claims, 6 Drawing Sheets

IMAGE FORMING SYSTEM AND CONTROL METHOD FOR THE SAME

BACKGROUND OF THE INVENTION

Field of the Invention

The present invention relates to a tandem image forming system (an image forming system of a tandem type) in which a plurality of image forming apparatuses is coupled in tandem, and to an image formation control method in this tandem image forming system.

Generally, tandem image forming systems are constituted such that a plurality of image forming apparatuses is coupled in tandem. In such a tandem image forming system, one image forming apparatus is configured to form images on one region on a recording sheet, successively, the recording sheet is input to another image forming apparatus, and the another image forming apparatus is configured to form images on another region on the recording sheet.

Further, in such a tandem image forming system, two image forming apparatuses are assigned to form images on respective surfaces of obverse and reverse surfaces of a recording sheet, whereby images can be formed and output at high rate. Furthermore, two image forming apparatuses are assigned to form images by using respective different color toners, whereby the images can be formed more precisely.

Moreover, two image forming apparatuses are assigned to form appropriate images on respective regions of a character region and an image region, whereby high-definition images can be formed. Namely, employment of two image forming apparatuses coupled in tandem enables to enhance the productivity.

A technique to execute processing efficiently in a tandem image forming system is proposed in Japanese Unexamined Patent Publication Nos. 2005-2251224, 2009-058623, and 2009-066937.

SUMMARY OF THE INVENTION

In the tandem image forming system described in Japanese Unexamined Patent Publication No. 2005-2251224, with PDL (Page Description Language) or an operator instruction, it is determined and instructed whether printing is performed by which one of two image forming apparatuses, and then the printing is performed.

According to the technique proposed in the tandem image forming system described in Japanese Unexamined Patent Publication No. 2009-058623, an amount of toner consumption is calculated separately for each of odd-numbered pages and even-numbered pages, and then an image forming apparatus having a larger amount of remaining toner is assigned to print pages needing a larger amount of toner consumption.

In the tandem image forming system described in Japanese Unexamined Patent Publication No. 2009-066937, a controller is disposed in each of two image forming apparatuses. This controller is configured to execute a process to expand print data described by PDL and constituted by code data and vector data into raster image data in a bitmap format by a RIP (Raster Image Processor) process. Then, according to the proposed technique, odd-numbered pages and even-numbered pages are assigned to respective different controllers for expansion of print data by the RIP process, and assigned to respective image forming apparatuses for printing of image data.

Incidentally, since the data size of the image data expanded by the RIP process becomes large, it is generally performed that the image data are compressed to reduce the image size and are stored in a HDD of an image forming apparatus in the compression state. Subsequently, generally, at a timing of printing, the image data in the compression state are read out and expanded so as to return the image data in a compression-cancelled state.

However, none of the above patent documents discloses and suggests a technique to perform the above compression and expansion efficiently in such a tandem image forming system so as to improve an output performance or to prevent an output performance from lowering.

In a common tandem image forming system, one of two image forming apparatuses is assigned to act as a master machine, and the other image forming apparatus is assigned to act as a slave machine. The image forming apparatus acting as the master machine performs a compressing process to reduce data size of image data from a controller used for both image data to be printed by the master machine and image data to be printed by the slave machine.

For this reason, since the image forming apparatus acting as the master machine is required to perform the compressing process and the expanding process for a self-apparatus and the compressing process for the other apparatus, there is a problem that the processing tends to delay due to increase of loads and the output performance tends to turn down.

The present invention has been achieved in view of such problems, and in a tandem image forming system in a state that a plurality of image forming apparatuses is coupled in tandem, an object of the present invention is to attain an image forming system and an image formation control method each of which can improve an output performance by performing compression and expansion of image data efficiently.

In order to attain at least one of the objects mentioned above, an image forming system reflecting one aspect of the present invention includes:

a first image forming apparatus configured to print an image corresponding to image data on a region of a recording sheet, and a second image forming apparatus coupled in tandem to the first image forming apparatus and configured to print an image corresponding to image data on another region of the recording sheet, wherein the first image forming apparatus includes two compressing and expanding sections to compress and expand image data, and is configured to receive both image data to be printed by the first image forming apparatus and image data to be printed by the second image forming apparatus, and wherein when performing any one process of a compressing process (compression processing) and an expanding process (expansion processing) for the image data to be printed by the first image forming apparatus and a compressing process for the image data to be printed by the second image forming apparatus, the first image forming apparatus controls to select a compressing and expanding section being used for no process from the two compressing and expanding sections and to assign the any one process to the selected compressing and expanding section.

In the above image forming system, it may be preferable to assign the compressing process and the expanding process for the image data to be printed by the first image forming apparatus to one of the two compressing and expanding sections, and to assign the compressing process for the image data to be printed by the second image forming apparatus to the other one of the two compressing and expanding sections.

In the above image forming system, it may be preferable that one of the two compressing and expanding sections is used for the compressing process and the expanding process for the image data to be printed and the other one of the two compressing and expanding sections is used for a compressing process for image data produced by scanning of documents.

In the above image forming system, it may be preferable that the second image forming apparatus includes two compressing and expanding sections to compress and expand image data, and wherein when performing any one process of an expanding process for image data to be printed and a compressing process for image data produced by scanning of documents, the second image forming apparatus controls to select a compressing and expanding section being used for no process from the two compressing and expanding sections and to assign the any one process to the selected compressing and expanding section.

DETAILED DESCRIPTION OF THE INVENTION

Hereafter, with reference to drawings, modes (hereafter, referred to as embodiment) for implementing the present invention will be described.

<Overall Constitution of an Image Forming System>

Description will be given for a tandem image forming system sown in FIGS. 1 to 3 as one embodiment of the present invention in which as a plurality of image forming apparatuses, a first image forming apparatus 100 and a second image forming apparatus 300 are coupled in tandem to be assigned to form images on respective surfaces of obverse and reverse surfaces or respective regions on one page in a recording sheet.

As a specific example, in the following embodiment, the first image forming apparatus 100 in the tandem image forming system is assigned to act as a master machine having initiative, and the second image forming apparatus 300 is assigned to act as a slave machine to play a subordinate role. In the following description, the first image forming apparatus 100 is merely referred to as an image forming apparatus 100, and the second image forming apparatus 300 is merely referred to as an image forming apparatus 300.

Further, in the following embodiment, to form images on recording sheets by the image forming apparatus 100 or by the image forming apparatus 300 is expressed as "to print".

Figure 1:
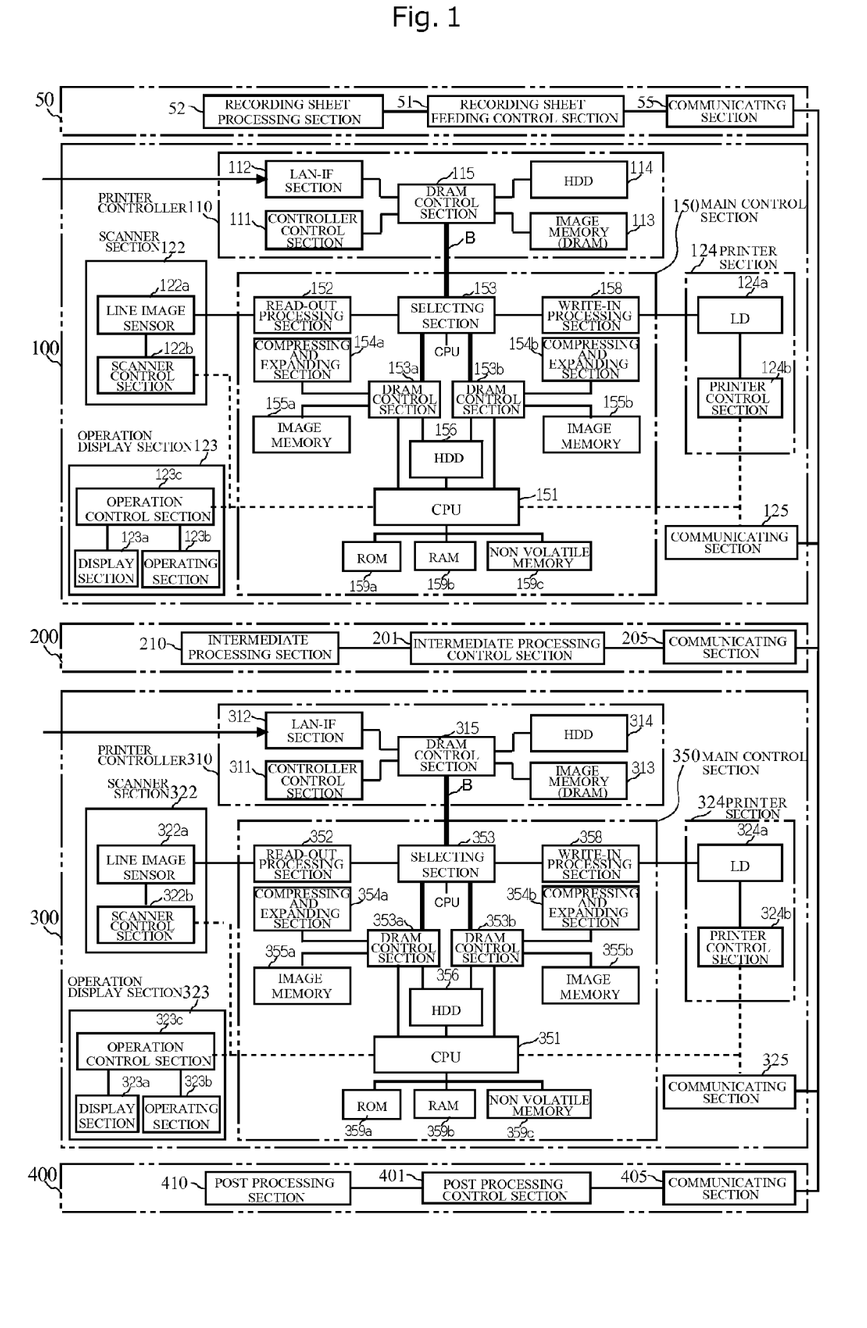
FIG. 1 is a block diagram showing a constitution of an image forming system of an embodiment of the present invention.
Figure 2:
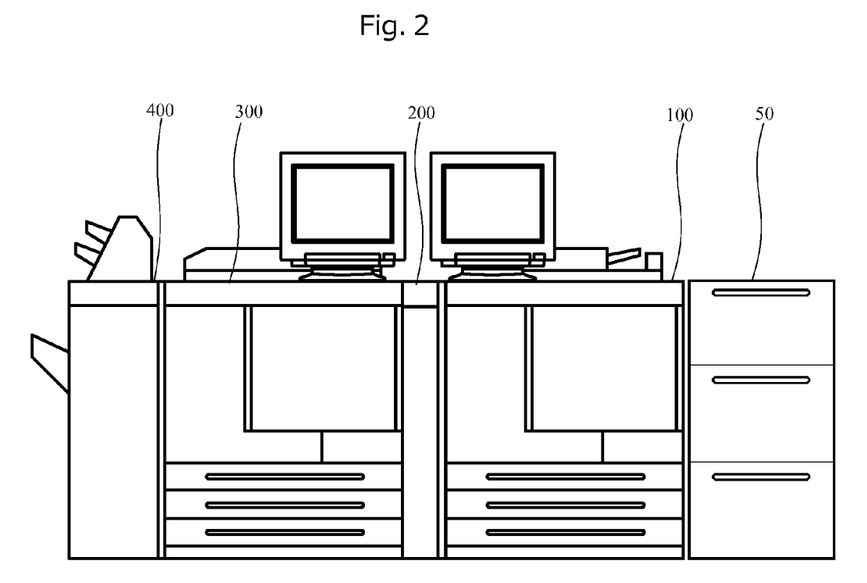
FIG. 2 is a constitutional diagram showing a constitution of an image forming system of an embodiment of the present invention.
Figure 3:
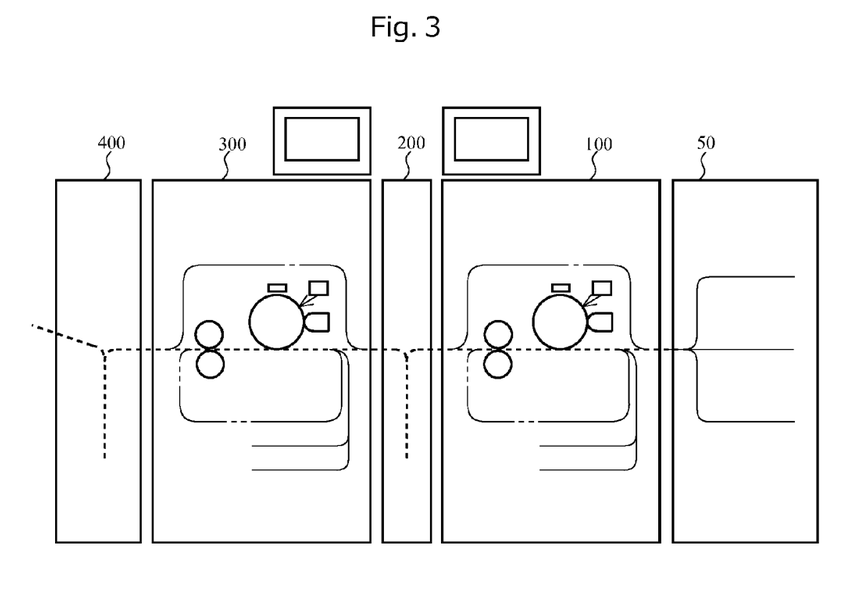
FIG. 3 is a constitutional diagram showing a constitution of an image forming system of an embodiment of the present invention.

FIGS. 1 to 3 show a state as a specific example in which in addition to a recording sheet feeding apparatus 50, an intermediate processing apparatus 200, and a post processing apparatus 400, two image forming apparatuses of the image forming apparatus 100 and the image forming apparatus 300 are coupled in tandem. However, three or more image forming apparatuses may be coupled in tandem. Further, it is also possible to make the image forming apparatus 100 and the image forming apparatus 300 to act as a single image forming apparatus.

In this tandem image forming system, as shown in FIGS. 2 and 3, the recording sheet feeding apparatus 50, the image forming apparatus 100, the intermediate processing apparatus 200, the image forming apparatus 300, and the post processing apparatus 400 are coupled in tandem in this order from the right to the left on the drawing along a flow of a recording sheet. The recording sheet feeding apparatus 50 is configured to feed and convey a recording sheet to be printed. The image forming apparatus 100 is assigned to print images on one surface of obverse and reverse surfaces or some regions on a page of a recording sheet. The intermediate processing apparatus 200 is configured to conduct intermediate processing such as reversing for a recording sheet on which images are formed by the image forming apparatus 100, and successively to supply the processed recording sheet to the image forming apparatus 300. The image forming apparatus 300 is assigned to print images on the other one surface of the obverse and reverse surfaces or the other regions on the page of the recording sheet supplied from the intermediate processing apparatus 200. The post processing apparatus 400 is configured to conduct various kinds of post processing (punch processing, staple processing, bind processing, and the like) for the recording sheets on which images are formed by the image forming apparatus 100 and the image forming apparatus 300.

In FIG. 3, a path shown with a broken line is a recording sheet passing path which indicates a flow of a recording sheet in the tandem image forming system. Further, a path shown with a one-dot chain line is a detour path to detour a recording sheet. Furthermore, a two-dot chain line is a double-sided printing path used at the time of formation of images on both surfaces of a recording sheet in the case where the image forming apparatus is used to act independently.

According to such an image forming system, by making a recording sheet pass on a recording sheet passing path shown with a broken line in FIG. 3, it becomes possible to reverse the recording sheet by the intermediate processing apparatus 200 disposed on the recording sheet passing path, thereby enabling to assign the image forming apparatus 100 and the image forming apparatus 300 to print images on their respective different surfaces of obverse and reverse surfaces of a recording sheet. Accordingly, there is an advantage that high speed output becomes possible.

Further, in such a tandem image forming system, in addition to the assignation of obverse and reverse surfaces of a recording sheet as mentioned above, it becomes also possible to assign the image forming apparatus 100 and the image forming apparatus 300 to print images on their respective different regions such as top and bottom or right and left on the same page of a recording sheet. Furthermore, it becomes also possible to assign the image forming apparatus 100 and the image forming apparatus 300 to print images with their respective different colors such as ordinary colors and specific colors on the same page of a recording sheet. Moreover, it becomes also possible to assign the image forming apparatus 100 and the image forming apparatus 300 to print images with respective different gradations such as images with no gradation like characters and image with gradation like photographic image.

Hereafter, with reference to FIGS. 1 and 2, the detailed structure of each apparatus in the tandem image forming system will be described sequentially.

As a specific example, the first image forming apparatus 100 in the tandem image forming system is assigned to act as a master (initiative or leading) machine having initiative, and the second image forming apparatus 300 is assigned to act as a slave machine to play a subordinate role. However, this relationship may be reversed.

Further, fundamentally, each of the image forming apparatus 100 and the image forming apparatus 300 is a stand-alone image forming apparatus of the same type. Accordingly, the tandem image forming system is constituted by a combination of stand-alone image forming apparatuses of the same type, and the image forming apparatus 100 and the image forming apparatus 300 are coupled to each other so as to be assigned to play respective roles of a master and a slave.

Furthermore, the recording sheet feeding apparatus 50, the image forming apparatus 100, the intermediate processing apparatus 200, the image forming apparatus 300, and the post processing apparatus 400 are constituted such that their respective control sections of the control section 51, control section 150, control section 201, and control section 350 conduct control cooperatively by communicating with each other via a communicating section 55, communicating section 125, communicating section 205, communicating section 325, and communicating section 405 respectively.

<Constitution of the Image Forming Apparatus>

In FIG. 1, the image forming apparatus 100 mainly includes a printer controller 110, a scanner section 122, an operation display section 123, a printer section 124, the communicating section 125, and the main control section 150.

The printer controller 110 is coupled to information processing devices, such as a personal computer (PC) through networks, such as a LAN (Local Area Network), and achieves a function to conduct a RIP (Raster Image Processor) process for print data contained in a print job transmitted from an information processing device so as to produce raster image data.

The print job which the printer controller 110 receives from an information processing device (not shown) includes print data in which characters and figures are represented with code data and vector data, for example, print data described with PDL (Page Description Language). On the hand, the raster image data produced by the RIP process are image data of a bitmap format to be used for image formation.

The printer controller 110 includes a controller controlling section 111 constituted by a CPU (Central Processing Unit) in order to conduct overall control for the actions of the printer controller 110; a LAN-IF section 112 configured to achieve a communicating function to couple networks; an image memory 113 to store raster image data produced by the RIP process; a hard disk drive (HDD) 114 to store print data received via the networks and intermediate data produced in the course of processing in the RIP process; and a DRAM (Dynamic Random Access Memory) control section 115 configured to achieve a read and write function for data for the image memory 113 and a transceiver function to conduct transmission and reception of various data with the image forming section 120.

In addition, although illustration is omitted, the controller controlling section 111 is coupled to a ROM (Read Only Memory) to store programs which are read out and executed by the controller controlling section 111 and fixed data, and to a work memory to store various data temporarily at the time of execution of the programs by the controller controlling section 111.

The scanner section 122 is configured to achieve a function to read out a document optically in a color or monochromatic mode and to acquire corresponding image data. This scanner section 122 includes a scanner control section 122b to control the whole actions of the scanner section 122 besides a line image sensor 122a.

The operation display section 123 is configured to achieve a function to display various setting screens and operation screens, a function to display various kinds of guide information, notices, warnings, and the like for operators, and a function to receive various setting and selecting operations, editing operations, output instructions (start instruction for printing) from operators. The operation display section 123 includes a display section 123a constituted by a liquid crystal display, an operating section 123b constituted by a touch switch and other switches disposed on the screen, and an operation control section 123c to control the display section 123a and the operating section 123b.

The printer section 124 is constituted by an electro-photographic type print engine, and includes laser diodes (LD) 124a controlled to turn on or off in accordance with image data and a printer control section 124b to control the actions of a process unit. The printer section 124 is configured to form images corresponding to the image data on a recording sheet. In this connection, the printer section 124 may be configured to form images by any one of methods other than the electro-photographic type.

Each of the scanner control section 122b, the operation control section 123c, and the printer control section 124b is constituted by a circuit which includes a CPU (Central Processing Unit), a ROM (Read Only Memory), and a RAM (Random Access Memory) as major portions, and is configured to execute various controls in accordance with programs stored in the ROM.

The main control section 150 is configured to achieve a function to conduct overall control for the whole actions of the image forming apparatus 100 in cooperation with the control section of each section. This main control section 150 includes a CPU 151, a read-out processing section 152, a selecting section 153, a DRAM control section 153a (DRAM control section (1)), a DRAM control section 153b (DRAM control section (2)), a compressing and expanding section 154a (compressing and expanding section (1)), a compressing and expanding section 154b (compressing and expanding section (2)), an image memory 155a (image memory (1)) constituted by a semiconductor memory, an image memory 155b (image memory (2)) constituted by a semiconductor memory, a hard disk drive (HDD) 156, a write-in processing section 158, a ROM 159a, a RAM 159b, and a non volatile memory 159c.

The CPU 151 achieves a function to control whole actions relating to image formation. Programs, various fixed data, and the like are stored in the ROM 159a, and the CPU 151 is configured to act in accordance with the programs stored in the ROM 159a. When the CPU 151 executes programs, the RAM 159b is used as a work memory to store various kinds of data temporarily. The non volatile memory 159c is a memory to store user data, system data, and various settings which are to be stored after power is turned off.

The read-out processing section 152 achieves a function to apply an expanding process, mirror image processing, error diffusion processing, and the like to image data output from the scanner section 122.

The selecting section 153 achieves a function to select the DRAM control section 153a and the DRAM control section 153b based on the instruction of the CPU 151.

The DRAM control section 153a conducts timing control of read-out, write-in, and refreshment for the image memory 155a composed of a dynamic RAM, timing control when image data are compressed and stored in the image memory

155*a*, and timing control when compressed image data are read out from the image memory 155*a* and expanded.

The DRAM control section 153*b* conducts timing control of read-out, write-in, and refreshment for the image memory 155*b* composed of a dynamic RAM, and timing control when image data are compressed and stored in the image memory 155*b*, and compressed image data are read out from the image memory 155*b* and expanded.

Further, each of the DRAM control section 153*a* and the DRAM control section 153*b* is coupled to the DRAM control section 115 of the printer controller 110 through a PCI (Peripheral Component Interconnect) bus via the selecting section 153, and achieves a function to conduct transmission and reception of various kinds of data with the printer controllers 110.

The compressing and expanding section 154*a* achieves a compression processing function to compress image data so as to produce compressed image data and an expansion processing function to expand compressed image data to original raster image data while using the image memory 155*a* as a storage region. The compressing and expanding section 154*b* achieves a compression processing function to compress image data so as to produce compressed image data and an expansion processing function to expand compressed image data to original raster image data while using the image memory 155*b* as a storage region.

The image memory 155*a* is configured to be used by the compressing and expanding section 154*a*, and achieves a function to store compressed image data produced by compression and expanded image data. The image memory 155*b* is configured to be used by the compressing and expanding section 154*b*, and achieves a function to store compressed image data produced by compression and expanded image data.

In the hard disk drive 156, data (job data) and the like of a print job received from the printer controller 110 are stored and saved.

The write-in processing section 158 achieves a function to output signals to turn on or off a LD 124*a* of each color in the printer section 124 with timing in response to the actions of the printer section 124 in accordance with image data which are read out from the image memory 155*a* and the image memory 155*b* and expanded.

In this embodiment, each of the image forming apparatus 100 and the image forming apparatus 300 has the identical constitution, and as with the printer controller 110 and the printer controller 310, the printer section 124 and the printer section 324, and the main control section 150 and the main control section 350, sections having the identical function are provided with corresponding reference numbers. Accordingly, overlapping descriptions are omitted.

<Actions of the Image Forming System and an Image Formation Control Method>

Here, with reference to flowcharts shown in FIGS. 4 to 7, description will be given for actions of image formation in the image forming system of this embodiment and control procedures in the image formation control method.

<Action (1)>

Figure 4:
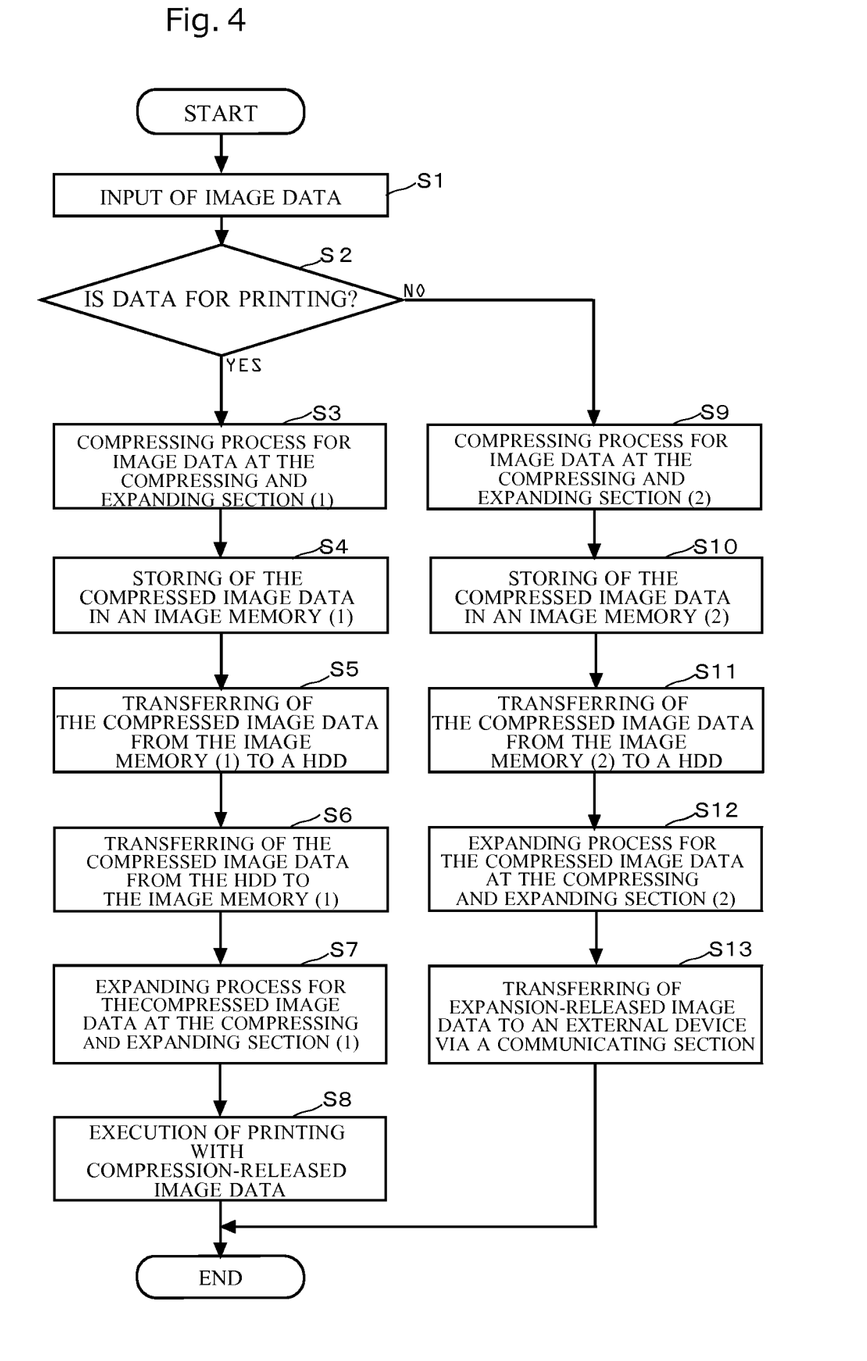
FIG. 4 is a flow chart showing actions of an image forming system of an embodiment of the present invention.

With reference to FIG. 4, description will be given for Action (1) when each of the image formation 100 or the image forming apparatus 300 is used solely. In the image forming system, the actions of the image forming apparatus 300 serving as a slave machine are the same as those of the image formation 100. Accordingly, here, the actions of the image forming apparatus 100 will be described.

The image forming apparatus 100 has functions, such as a copying machine, a printer, and a scanner. Due to any one of the function, image data as raster image data having been subjected to the RIP process are transmitted to be used for printing from the printer controller 110 through a bus B to the main control section 150 (Step S1 in FIG. 4).

Here, in the case where the image data from the printer controller 110 is used for printing, the DRAM control section 153*a*, the compressing and expanding section 154*a* (compressing and expanding section (1)), and the image memory 155*a* (image memory (1)) are selected by the selecting section 153 (YES at Step S2 in FIG. 4).

At this time, when the inflow rate of image data from the printer controller 110 is faster than the output rate of the printer section 124, overflow occurs. In order to prevent this overflow, image data are saved in the HDD 156 temporarily. Herein, as a transfer amount of data in data transfer between the image memory 155*a* and the HDD 156 is smaller, the performance of the data transfer is improved more. Accordingly, it is necessary to compress image data before storing the image data in the HDD 156. Then, image data are compressed by the compressing and expanding section 154*a* (Step S3 in FIG. 4), the compressed image data are stored in the image memory 155*a* (Step S4 in FIG. 4), and thereafter the compressed image data are transferred to the HDD 156 (Step S5 in FIG. 4).

Further, when printing the compressed image data by the printer section 124, it is necessary to cancel the compression so as to expand the image data and to transmit the expanded image data. Accordingly, image data stored in the HDD 156 in a compression state are transferred to the image memory 155*a* (Step S6 in FIG. 4), the compressed image data are expanded by use of the compressing and expanding section 154*a* in the DRAM control section 153*a* (Step S7 in FIG. 4), and the image data in the compression-cancelled state are transferred to the printer section 124 and printed (Step S8 in FIG. 4).

Furthermore, the image forming apparatus 100 can perform processing called "network scanning process" in which image data acquired by scanning of documents with the scanner section 122 are transferred to other devices via networks. In this case, it is possible to perform the network scanning process with timing when image data are output to the printer section 124. Furthermore, it is possible to perform the network scanning process with timing when image data used for image formation are inflowing from the printer controller 110.

In this case, when there is a difference between a acquisition rate at which image data of a plurality of pages are acquired by the network scanning process and a transfer rate at which image data are transferred to external devices via a network, it is necessary to store temporarily the image data acquired by the network scanning process in the HDD 156. When the image data are stored in the HDD 156, as the data size is smaller, performance is improved more. Accordingly, the image data acquired by scanning are compressed.

At this time, since there is a possibility that the compressing and expanding section 154*a* (compressing and expanding section (1)) is used for the printing process mentioned above, the selecting section 153 is configured to select the DRAM control section 153*b*, the compressing and expanding section 154*b* (compressing and expanding section (2)), and the image memory 155*b* (image memory (2)) (No at Step S2 in FIG. 2). The image data are compressed in the compressing and expanding section 154*b* (Step S9 in FIG. 4), the compressed image data are stored in the image memory 155*b* (Step S10 in FIG. 4), and thereafter the compressed image data are transferred to the HDD 156 (Step S11 in FIG. 4).

When the image data acquired by the network scanning process are transferred to an external device, it is necessary to transmit image data which are released from the compression and expanded. Accordingly, at a time point when the network scanning process for a plurality of pages has been completed, the compressed image data are expanded by the compressing and expanding section 154b (Step S12 in FIG. 4), and the image data in the compression-cancelled state are transferred to the external device (step S13 in FIG. 4).

In this way, in the case where the image forming apparatus 100 is used to act independently, when anyone action of an action as a copying machine or a printer and an action for the network scanning process is performed, a compressing and expanding section being used for no action among the compressing and expanding section 154a and the compressing and expanding section 154b is selected. With this, even if the timing of printing overlaps with the timing of a network scanning process, an output performance is made to be not lowered. In the above description, if the selection (Step S2 in FIG. 4) by the selecting section 153 depending on whether or not the data are used for printing is changed to the reverse selection, there is no problem.

<Action (2)>

In this embodiment, for example, the first image forming apparatus 100 disposed at the upstream side in the flow of a recording sheet is assigned to act as a master machine, and the second image forming apparatus 300 disposed at the downstream side is assigned to act as a slave machine.

In such a tandem image forming system, in the case of single-sided print, the master machine is assigned to print odd-numbered pages, and then the recording sheets of the odd-numbered pages are made to pass along a detour path for the slave machine. On the other hand, the recording sheets of even-numbered pages are made to pass along a detour path for the master machine, and then the slave machine is assigned to print even-numbered pages. By processing in this way, for example, when the productivity of an image forming apparatus as a single machine is 125 ppm (paper per minutes), the productivity of the image forming system becomes 250 ppm. Accordingly, the image forming system can print with the productivity two times that of the single machine.

In the tandem image forming system, image data having been subjected to the RIP process are produced by the printer controller 110 of the image forming apparatus 100 acting as a master machine, and the main control section 150 judges whether image data are output by the image forming apparatus 100 or the image forming apparatus 300. When it is judged that image data are output by the image forming apparatus 300, the image data are compressed, and the compressed image data are transferred to the image forming apparatus 300 through the communicating section. Then, upon receipt of the compressed image data, the image forming apparatus 300 applies the expanding process for the compressed image data, prints the expanded image data on a recording sheet by the printer section 324, and outputs the recording sheet.

Herein, as described in Action (1) mentioned above, in the system that the compressing process and the expanding process for printing are assigned to the compressing and expanding section 154a and the compressing process and the expanding process for the network scanning process are assigned to the compressing and expanding section 154b, the compressing and expanding section 154a is required to perform the compressing process and the expanding process for printing in the image forming apparatus 100 and the compressing process for printing in the image forming apparatus 300. That is, the image forming apparatuses 100 being the master machine is required to perform the compressing process and the expanding process for image data for the image forming apparatuses 100, and further to perform the compressing process for image data for the image forming apparatuses 300 being the slave machine. Even in the case where the processing capacity of the compressing and expanding section 154a is designed to be no problem at the time of action as a single machine of an image forming apparatus, there is a possibility that in the case of tandem image formation, a processing amount increases, a waiting time occurs, and, as a result, image formation may delay.

Then, at the time of tandem image formation, the scanner section 122 of the image forming apparatus 100 being the master machine is made not to act, and if the compressing and expanding section 154b which is originally used for the network scanning process is used in combination for the tandem image formation so as to perform a compressing process, it is efficient.

Hereafter, with reference to FIG. 5, description will be given for Action (2) of the image formation 100 and the image forming apparatus 300 in the tandem image forming system.

Figure 5:
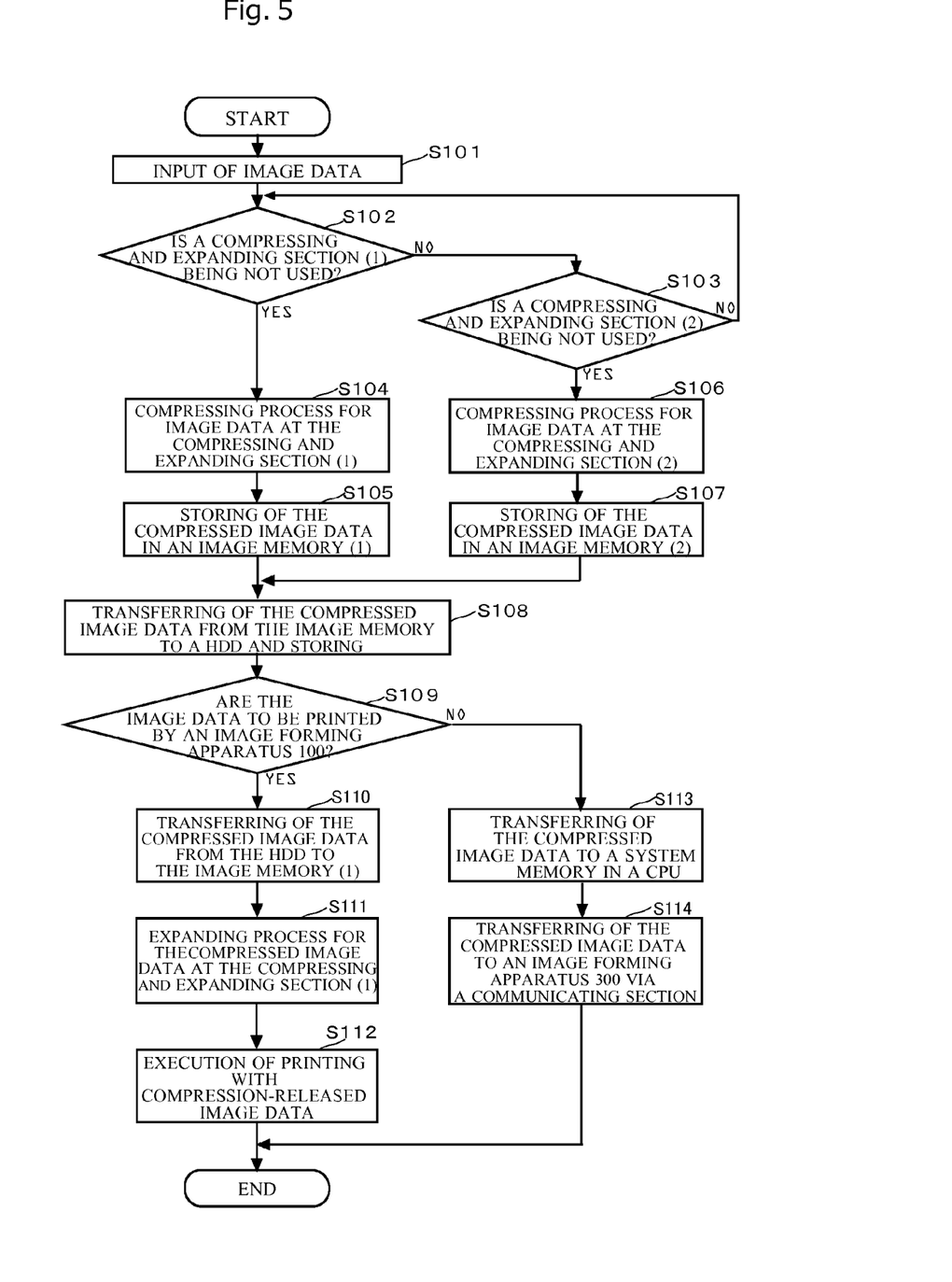
FIG. 5 is a flow chart showing actions of an image forming system of an embodiment of the present invention.

In the tandem image forming system, image data as raster image data having been subjected to the RIP process are transmitted to be used for printing from the printer controller 110 through the bus B to the main control section 150 (Step S101 in FIG. 5).

Here, the CPU 151 refers to the working state of each of the compressing and expanding section 154a and the compressing and expanding section 154b, either one of the compressing and expanding sections being not used is selected by the selecting section 153 based on an instruction of the CPU 151 (Step S102 and S103 in FIG. 5).

When both the compressing and expanding section 154a and the compressing and expanding section 154b are not used, in accordance with the judgment of the CPU 151 (YES at Step S102 in FIG. 5) that the compressing and expanding section 154a (compressing and expanding section (1)) is not used, the compressing and expanding section 154a is selected by the selecting section 153 (Step S104 in FIG. 5). Here, image data are compressed by the compressing and expanding section 154a (Step S104 in FIG. 5), the compressed image data are stored in the image memory 155a (Step S105 in FIG. 5), and thereafter, the compressed image data are transferred to the HDD 156 (Step S108 in FIG. 5).

On the other hand, when the compressing and expanding section 154a is being used (NO at Step S102 in FIG. 5) and the compressing and expanding section 154b is not used (YES at Step S103 in FIG. 5), the selecting section 153 selects the compressing and expanding section 154b (compressing and expanding section (2)) (Step S106 in FIG. 5). Here, image data are compressed by the compressing and expanding section 154b (Step S106 in FIG. 5), the compressed image data are stored in the image memory 155b (Step S107 in FIG. 5), and thereafter, the compressed image data are transferred to the HDD 156 (Step S108 in FIG. 5).

If the CPU 151 judges such that the image data stored in the HDD 156 (Step S108 in FIG. 5) are to be printed at the image forming apparatus 100 side being the master machine side (YES at Step S109 in FIG. 5), since it is necessary to transmit image data released from the compression and expanded at the time of printing in the printer section 124, the image data stored in the HDD 156 in the compression state are transferred to the image memory 155a (Step S110 in FIG. 5). The compressed image data are expanded by use of the compressing and expanding section 154a in the DRAM control section 153a (Step S111 in FIG. 5). Then, the image data in the compression-cancelled state are transferred to the printer section 124, and printed (Step S112 in FIG. 5).

When the expanding process is conducted for printing by use of the compressing and expanding section 154a in this way, if image data input from the printer controller 110 are to be compressed, as already described, the selecting section 153 selects the compressing and expanding section 154b (NO at Step S102, YES at Step S103, and S106 in FIG. 5).

On the other hand, if the CPU 151 judges such that the image data stored in the HDD 156 (Step S108 in FIG. 5) are to be printed at the image forming apparatus 300 side being the slave machine side (NO at Step S109 in FIG. 5), the image data are transferred to the system memory in the CPU 151 (Step S113 in FIG. 5), and thereafter, the image data are transferred from the system memory in the CPU 151 through the communicating section 125 to the image forming apparatus 300 (Step S114 in FIG. 5).

Then, the image data in the compression state transferred from the image forming apparatus 100 via the communicating section 325 of the image forming apparatus 300 and the system memory in the CPU 351 of the image forming apparatus 300 are stored in the HDD 356 of the image forming apparatus 300. Then, the image data in the compression state are expanded by use of the compressing and expanding section 354a in the DRAM control section 353a of the image forming apparatus 300 being the slave machine, and the image data in the compression-cancelled state are transferred to the printer section 324, and printed (refer to the description of Action (1) and FIG. 4).

As mentioned above, by selecting the compressing and expanding section 154a and the compressing and expanding section 154b in accordance with the working state, the compressing process and the expanding process for image data are performed efficiently, whereby the output performance of printing can be improved. Namely, the first image forming apparatus 100 is equipped with two compressing and expanding sections and acts as the master machine, and both image data to be printed in the master machine and image data to be printed in the slave machine are input to the first image forming apparatus 100. When the first image forming apparatus 100 performs any one process of a compressing process (compression processing) and an expanding process (expansion processing) for image data to be printed in the master machine and a compressing process for image data to be printed in the slave machine, the first image forming apparatus 100 controls to select one compressing and expanding section being used for no process from the two compressing and expanding sections and to assign the any one process to the selected compressing and expanding section. Accordingly, the compressing process and the expanding process for the master machine and the compressing process for the slave machine can be performed in parallel, so that any one of the processes does not delay. As a result, in the tandem image forming system in the state that a plurality of the image forming apparatuses 100 and the image forming apparatuses 300 are coupled in tandem, the compression and expansion of image data can be performed efficiently, whereby the output performance can be enhanced.

Moreover, during the printing in the above tandem image forming system, if a network scanning process is to be performed, by use of the scanner section 322 of the image forming apparatus 300 being the slave machine, and further by use of the compressing and expanding section 354b (compressing and expanding section (2)) being not used (being not assigned to be used) in the image forming apparatus 300 being the slave machine, it becomes possible to perform the network scanning process without giving influence to the output performance of the printing.

<Action (3)>

Here, description will be given for a modified example of Action (2) mentioned above with reference to a flowchart shown in FIG. 6. In Step S101 to Step S108 and Step S113 to Step S114 in FIG. 6, the same processes as those in Action (2) in the flowchart shown in FIG. 5 are performed. Accordingly, the duplicate description is omitted.

Figure 6:
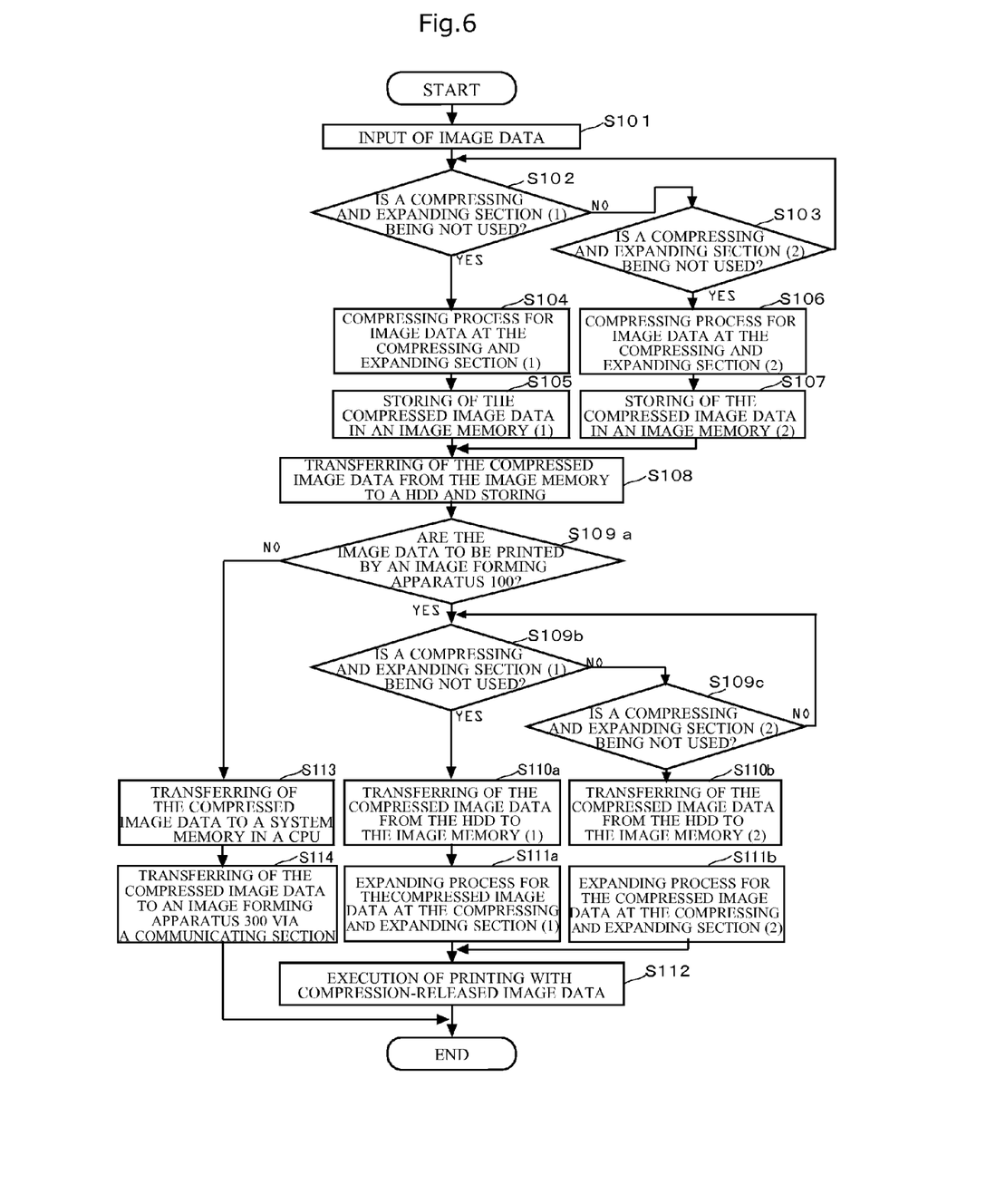
FIG. 6 is a flow chart showing actions of an image forming system of an embodiment of the present invention.

If the CPU 151 judges such that the image data stored in the HDD 156 (Step S108 in FIG. 6) are to be printed at the image forming apparatus 100 side (YES at Step S109a in FIG. 6), the CPU 151 refers the working state of the compressing and expanding section 154a and the compressing and expanding section 154b, and either one compressing and expanding section being not used is selected by the selecting section 153 based on an instruction of the CPU 151 (Step S109b, S109c in FIG. 6).

When both the compressing and expanding section 154a and the compressing and expanding section 154b are not used, based on the judgment of the CPU 151 that the compressing and expanding section 154a is not used (YES at Step S109b in FIG. 6), the compressing and expanding section 154a is selected by the selecting section 153. Here, at the time of printing in the printer section 124, since it is necessary to transmit image data which are released from compression and expanded, the RAM control section 153a transmits the image data in the compression state stored in the HDD 156 to the image memory 155a (Step S110a in FIG. 6). Then, the compressed image data are expanded by use of the compressing and expanding section 154a in the DRAM control section 153a (Step S111a in FIG. 6), and the image data in the compression-cancelled state are transmitted to the printer section 124, and printed (Step S112 in FIG. 6).

On the other hand, when the compressing and expanding section 154a is being used and the compressing and expanding section 154b is not being used, by judgment of the CPU 151 that the compressing and expanding section 154b is not being used (YES at Step S109c in FIG. 6), the compressing and expanding section 154b is selected by the selecting section 153. Here, at the time of printing in the printer section 124, since it is necessary to transmit image data which are released from compression and expanded, the RAM control section 153b transmits the image data in the compression state stored in the HDD 156 to the image memory 155b (Step S110b in FIG. 6). Then, the compressed image data are expanded by use of the compressing and expanding section 154b in the DRAM control section 153b (Step S111b in FIG. 6), and the image data in the compression-cancelled state are transmitted to the printer section 124, and printed (Step S112 in FIG. 6).

As mentioned above, by selecting the compressing and expanding section 154a and the compressing and expanding section 154b in accordance with the working state, the compressing process and the expanding process for image data are performed efficiently, whereby the output performance of printing can be improved.

Moreover, during the printing in the above tandem image forming system, if a network scanning process is to be performed, by use of the scanner section 322 of the image forming apparatus 300 being the slave machine, and further by use of the compressing and expanding section 354b (compressing and expanding section (2)) being not used (being not assigned to be used) in the image forming apparatus 300 being the slave machine, it becomes possible to perform the network scanning process without giving influence to the output performance of the printing.

<Action (4)>

In this embodiment, for example, the first image forming apparatus 100 disposed at the upstream side in the flow of a recording sheet is assigned to act as a master machine, and the second image forming apparatus 300 disposed at the downstream side is assigned to act as a slave machine. In such a tandem image forming system, in the case where both-sided print is performed, the first image forming apparatus 100 being the master machine is assigned to print the obverse surface of a recording sheet, the intermediate processing apparatus 200 is configured to reverse the recording sheet, and the second image forming apparatus 300 being the slave machine is assigned to print the reverse surface of the recording sheet. By processing in this way, for example, when the productivity of an image forming apparatus is 125 ppm, the tandem image forming system acts as a printing system capable of producing both-sided print at 125 ppm.

Hereafter, with reference to a flowchart shown in FIG. 7, description will be given for Action (4) of the image formation 100 and the image forming apparatus 300 in the tandem image forming system.

Figure 7:
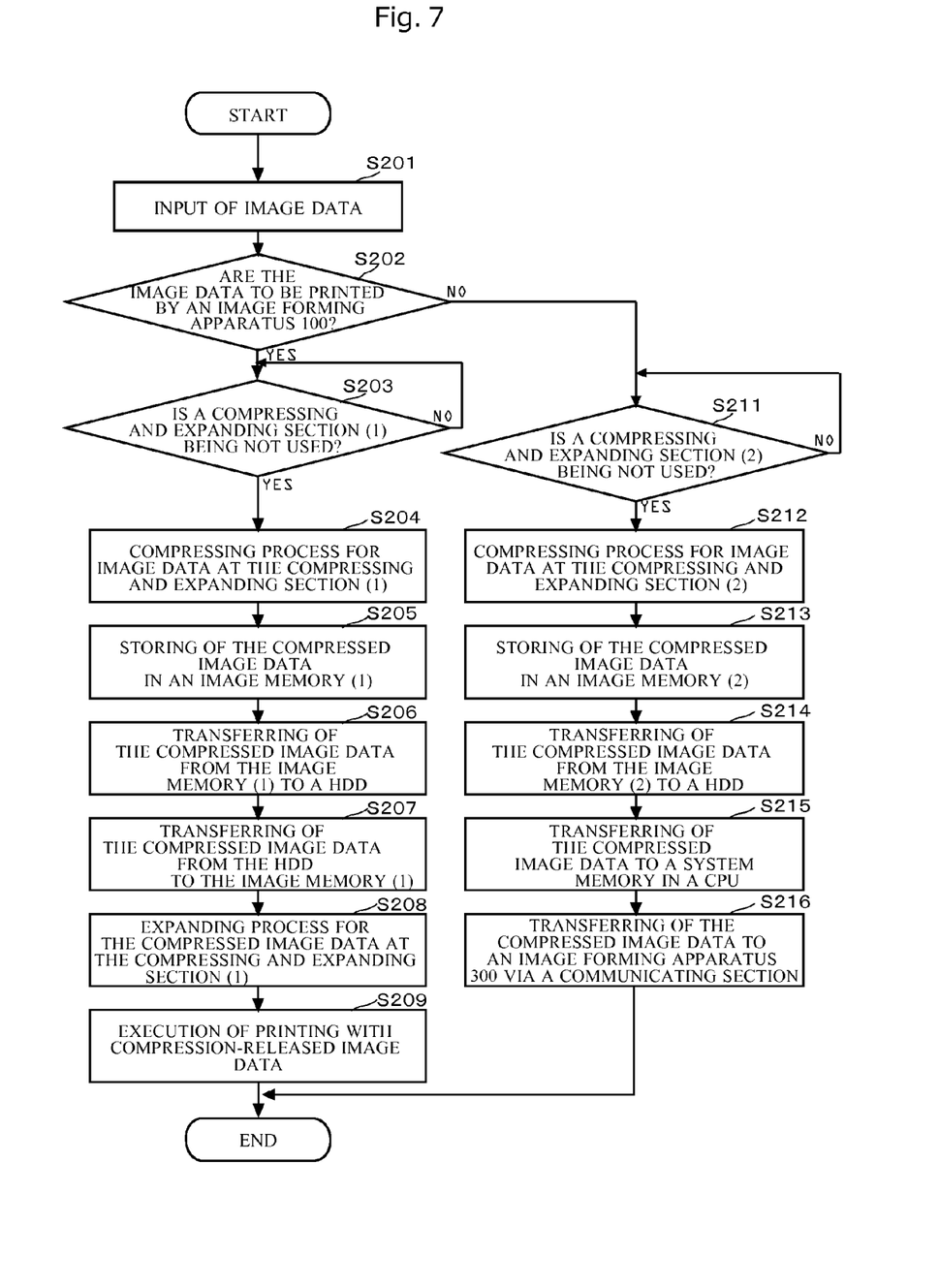
FIG. 7 is a flow chart showing actions of an image forming system of an embodiment of the present invention.

In the tandem image forming system, image data as raster image data having been subjected to the RIP process are transmitted for printing from the printer controller 110 to the main control section 150 through the bus B (Step S201 in FIG. 7).

If the CPU 151 judges such that the input image data are to be printed at the image forming apparatus 100 side (YES at Step S202 in FIG. 7), the selecting section 153 selects the compressing and expanding section 154a. Here, the CPU 151 refers the working state of the compressing and expanding section 154a, if the compressing and expanding section 154a is not being used (YES at Step S203 in FIG. 7), the image data are compressed in the compressing and expanding section 154a (Step S204 in FIG. 7), the compressed image data are stored in the image memory 155a (step S205 in FIG. 7), and then the compressed image data are transferred to the HDD 156 (Step S206 in FIG. 7). Further, at the time of printing in the printer section 124, since it is necessary to transmit image data which are released from compression and expanded, the image data in the compression state stored in the HDD 156 are transferred to the image memory 155a (Step S207 in FIG. 7). Then, the compressed image data are expanded by use of the compressing and expanding section 154a in the DRAM control section 153a (Step S208 in FIG. 7), and the image data in the compression-cancelled state are transferred to the printer section 124, and printed (Step S209 in FIG. 7).

On the other hand, if the CPU 151 judges such that the input image data are to be printed at the image forming apparatus 300 side (NO at Step S202 in FIG. 7), the selecting section 153 is configured to select the compressing and expanding section 154b. Here, the CPU 151 refers the working state of the compressing and expanding section 154b. Then, if the compressing and expanding section 154b is not being used (YES at Step S211 in FIG. 7), the image data are compressed in the compressing and expanding section 154b (Step S212 in FIG. 7), and the compressed image data are stored in the image memory 155b (step S215 in FIG. 7). Thereafter, the compressed image data are transferred to the HDD 156 (Step S214 in FIG. 7). Successively, the compressed image data stored in the HDD 156 are transferred to the system memory in the CPU 351 (Step S215 in FIG. 7), and then the compressed image data are transferred from the system memory in the CPU 351 via the communicating section 125 to the image forming apparatus 300 (Step S216 in FIG. 7). In turn, the image data in the compression state transferred from the image forming apparatus 100 are stored in the HDD 356 via the communicating section 325 of the image forming apparatus 300 and the system memory in the CPU 351 of the image forming apparatus 300. Subsequently, the image data in the compression state are expanded by use of the compressing and expanding section 354a in the DRAM control section 353a of the image forming apparatus 300, and the image data in the compression-cancelled state are transferred to the printer section 324, and printed (refer to the description in Action (1) and FIG. 4).

As mentioned above, by selecting the compressing and expanding section 154a and the compressing and expanding section 154b in accordance with an image forming apparatus assigned to execute printing, the compressing process and the expanding process for image data are performed efficiently, whereby the output performance of printing can be improved without making image data wait for a compressing process or an expanding process.

Further, in Action (4) mentioned above, since the compressing and expanding section 154a and the compressing and expanding section 154b are selected depending on an image forming apparatus used for outputting, and are assigned to do processing, it becomes unnecessary to monitor and judge the working state. As a result, there is an advantage that the control can be simplified.

Furthermore, if a network scanning process is required to be achieved during printing in the tandem image forming system, by using the scanner section 322 of the image forming apparatus 300 being the slave machine, and further by using the compressing and expanding section 354b (compressing and expanding section (2)) being not used (being not assigned to do processing) in the image forming apparatus 300 being the slave machine, the network scanning process can be achieved without giving influence to the output performance of the printing.

Other Embodiments

As mentioned above, the embodiments of the present invention are described based on the drawings. However, specific structures are not limited to the structures shown in the embodiments. Modification and addition may be made in a range in which they do not deviate from the summary of the present invention, and such modification and addition may be included in the present invention.

In the above embodiments, the printer controller 110 is incorporated inside the image forming apparatus 100, and the printer controller 310 is incorporated inside the image forming apparatus 300. The present invention is not limited to this constitution, and such a printer controller may be disposed outside the image forming apparatuses 100 and 300. In the case where the printer controller 110 is disposed outside the image forming apparatus 100, transmission and reception of data between the printer controller 110 and the image forming apparatus 100 are achieved via an interface proper to such communication.

The image forming apparatus 100 and the image forming apparatus 300 in the above embodiments may be not provided with the scanner sections 122 and 322 respectively, and they may be constituted as a printer of a simple body, and may be a monochrome image forming apparatus or a color image forming apparatus.

Further, the sheet feeding apparatus 50, the intermediate processing apparatus 200, and the post processing apparatus 400 may be used as required, and they may be incorporated in the image forming apparatus 100 or the image forming apparatus 300.

Moreover, in order to attain the objects of the present invention mentioned above, an image forming system reflecting another aspect of the present invention includes:

a first image forming apparatus configured to print an image corresponding to image data on a region of a recording sheet, and a second image forming apparatus coupled in tandem to the first image forming apparatus and configured to print an image corresponding to image data on another region of the recording sheet, wherein the first image forming apparatus includes two compressing and expanding sections to compress and expand image data, and is configured to receive both image data to be printed by the first image forming apparatus and image data to be printed by the second image forming apparatus, and wherein the first image forming apparatus controls to select a compressing and expanding section being used for no process from the two compressing and expanding sections, and to assign the selected compressing and expanding section for a compressing process and an expanding process for the image data to be printed by the first image forming apparatus and a compressing process for the image data to be printed by the second image forming apparatus.

DESCRIPTION OF REFERENCE SYMBOLS

100 Image forming apparatus
110 Printer controller
111 Controller control section
112 LAN-IF section
113 Image memory
114 Hard disc drive (HDD)
115 DRAM control section
122 Scanner section
123 Operation display section
124 Printer section
150 Main control section
151 CPU
152 Read-out processing section
153a DRAM control section
153b DRAM control section
154a Compressing and expanding section
154b Compressing and expanding section
155a Image memory
155b Image memory
156 Hard disc drive (HDD)
158 Write-in processing section
159a ROM
159b RAM
159c Non volatile memory

What is claimed is:

1. An image forming system comprising:
a first image forming apparatus configured to print an image corresponding to image data on a region of a recording sheet, and
a second image forming apparatus coupled in tandem to the first image forming apparatus and configured to print an image corresponding to image data on another region of the recording sheet,
wherein each of the first image forming apparatus and the second image forming apparatus includes two compressing and expanding sections to compress and expand image data, the first image forming apparatus being configured to receive both image data to be printed by the first image forming apparatus and image data to be printed by the second image forming apparatus,
wherein when performing any one process of a compressing process and an expanding process for the image data to be printed by the first image forming apparatus and a compressing process for the image data to be printed by the second image forming apparatus, the first image forming apparatus controls to select a compressing and expanding section which is not being used from among the two compressing and expanding sections thereof, and to assign the any one process to the selected compressing and expanding section, and
wherein when performing any one process of an expanding process for image data to be printed and a compressing process for image data produced by scanning of documents, the second image forming apparatus controls to select a compressing and expanding section which is not being used from among the two compressing and expanding sections thereof, and to assign the any one process to the selected compressing and expanding section.

2. The image forming system according to claim 1, wherein the first image forming apparatus is configured to assign the compressing process and the expanding process for the image data to be printed by the first image forming apparatus to a first one of the two compressing and expanding sections thereof, and to assign the compressing process for the image data to be printed by the second image forming apparatus to a second one of the two compressing and expanding sections thereof.

3. The image forming system according to claim 1, wherein a first one of the two compressing and expanding sections of the first image forming apparatus is used for the compressing process and the expanding process for the image data to be printed, and a second one of the two compressing and expanding sections of the first image forming apparatus is used for a compressing process for image data produced by scanning of documents at the first image forming apparatus.

4. A control method for an image forming system in which a first image forming apparatus and a second image forming apparatus coupled in tandem to the first image forming apparatus are assigned differently to print images corresponding to image data on respective different regions on a recording sheet, the method comprising:
inputting both image data to be printed by the first image forming apparatus and image data to be printed by the second image forming apparatus into the first image forming apparatus, wherein each of the first image forming apparatus and the second image forming apparatus includes two compressing and expanding sections to compress and expand image data;
selecting a compressing and expanding section which is not being used from among the two compressing and expanding sections of the first image forming apparatus when performing any one process of a compressing process and an expanding process for the image data to be printed by the first image forming apparatus and a compressing process for the image data to be printed by the second image forming apparatus;
assigning the any one process to the selected compressing and expanding section of the first image forming apparatus;
selecting a compressing and expanding section which is not being used from among the two compressing and expanding sections of the second image forming apparatus when performing any one process of an expanding process for image data to be printed and a compressing process for image data produced by scanning of documents; and assigning the any one process to the selected compressing and expanding section of the second image forming apparatus.

5. The control method according to claim 4, wherein the compressing process and the expanding process for the image data to be printed by the first image forming apparatus are assigned to a first one of the two compressing and expanding sections of the first image forming apparatus, and the compressing process for the image data to be printed by the second image forming apparatus is assigned to a second one of the two compressing and expanding sections of the first image forming apparatus.

6. The control method according to claim 4, wherein the compressing process and the expanding process for the image data to be printed are assigned to a first one of the two compressing and expanding sections of the first image forming apparatus, and a compressing process for image data produced by scanning of documents at the first image forming apparatus is assigned to a second one of the two compressing and expanding sections of the first image forming apparatus.

* * * * *